United States Patent [19]

Mowbray

[11] 4,326,139

[45] Apr. 20, 1982

[54] ELECTROMAGNETIC DEVICES

[75] Inventor: Dorian F. Mowbray, Burnham, England

[73] Assignee: Lucas Industries Limited, Birmingham, England

[21] Appl. No.: 160,482

[22] Filed: Jun. 18, 1980

[30] Foreign Application Priority Data

Sep. 8, 1979 [GB] United Kingdom ............... 31257/79

[51] Int. Cl.[3] ............................................ H02K 15/00

[52] U.S. Cl. ....................................... 310/42; 310/27; 310/30; 310/112

[58] Field of Search .................. 310/67, 71, 112, 114, 310/126, 42, 27, 30

[56] References Cited

U.S. PATENT DOCUMENTS 3,596,122 7/1971 Stewart ................................ 310/67
3,976,965 8/1976 Remus .................................. 310/71
4,156,822 5/1979 Roddy et al. ..................... 310/42 X
4,238,699 12/1980 Seilly .................................... 310/27

*Primary Examiner*—Donovan F. Duggan

[57] ABSTRACT

An electromagnetic device comprises a stator structure and an armature surrounding the stator structure. The stator structure is provided with axially spaced pole pieces which are of annular form and between which are located electrical windings connected so that adjacent pole pieces have opposite magnetic polarity. The armature has complementary pole pieces and when the windings are energized the armature will move relative to the stator structure. In order to facilitate construction of the device the stator structure is formed as a plurality of portions each of which has a cylindrical portion and a rim portion. The armature is formed as a stack of annular portions each of which includes an inwardly extending pole piece. The device is constructed by assembling the armature and stator structure alternately and in sequence.

8 Claims, 1 Drawing Figure

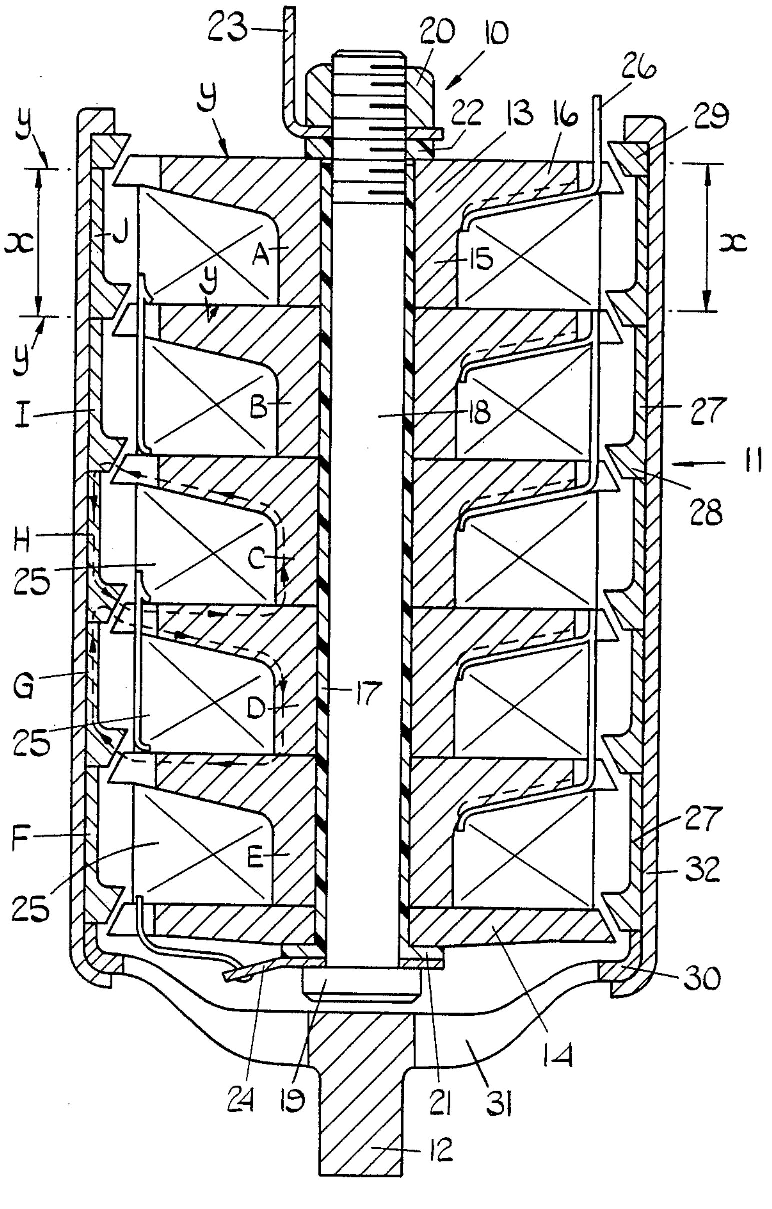
23
20
10
26
22
13
16
29
y
y
y
x
x
J
A
15
y
y
B
18
I
27
11
28
H
C
25
G
D
17
25
F
E
27
32
25
30
14
31
24
19
21
12

ELECTROMAGNETIC DEVICES

This invention relates to an electromagnetic device of the kind comprising a stator structure which defines a plurality of axially spaced circumferentially extending pole pieces, the stator structure including windings which when supplied with electric current cause adjacent ones of said pole pieces to assume opposite magnetic polarity and an armature which surrounds the stator structure, the armature being of annular form and having on its internal peripheral surface pole pieces complementary to the pole pieces in the stator structure.

The armature can be passed over the stator structure of a device as set forth above only if the air gaps between the pole pieces of the armature and stator structure extend parallel to the longitudinal axis of the stator structure. If it is desired that the air gaps should not extend as aforesaid, i.e. that the pole pieces on the stator structure and armature should overlap, then unless the device is of stepped form, the armature cannot be assembled about the stator structure because the pole pieces on the armature and stator structure will interfere with each other. One solution is to divide the armature axially into one or more parts which are then assembled about the stator structure and clamped together. The production of the armature parts is not easy since they will be of arcuate form and it is necessary to ensure that the parts of the pole pieces on each shell are accurately made so that they align correctly when the armature parts are clamped together.

The object of the present invention is to provide a device of the kind specified in a simple and convenient form.

According to the invention in a device of the kind specified the stator structure comprises a stack of stator portions each defining a central portion for facial engagement with the adjacent portion, and a rim portion which defines a pole piece and the armature comprises a stack of annular portions each of which defines a pole piece whereby the stator structure and the armature can be assembled alternately and in sequence.

One example of an electro-magnetic device in accordance with the invention will now be described with reference to the accompanying drawing which shows a sectional side elevation of the device.

Referring to the drawing the device comprises a stator structure generally indicated at 10 and an armature generally indicated at 11 surrounding the stator structure. The armature 11 is connected to an output member 12 whereby when windings on the stator structure are energised, the output member 12 will be moved in a direction away from the stator structure.

The stator structure 10 comprises a stack of stator portions 13 each stator portion being of identical shape. In addition the stator structure includes an end plate 14. The stator portions 13 and the end plate 14 are formed from magnetisable material. Each stator portion comprises a generally cylindrical portion 15 from which extends a rim 16. From the drawing it will be noted that the thickness of the rim reduces as the distance from the centre line increases. Each stator portion is provided with an aperture and the end plate 14 is similarly provided with an aperture.

Extending through the apertures in the stator portions and the end plate is an electrically insulating sleeve 17 and extending within the sleeve is a through bolt 18. At one end the through bolt is provided with a head 19 and at its opposite ends it is screw threaded to receive a nut 20. Located between the head 19 and the plate 14 is an electrically insulating washer 21 and a similar washer 22 is provided between the adjacent stator portion and a terminal 23 trapped between the washer and the nut 20. Moreover, located between the head 19 of the through bolt and the washer 21 is a terminal piece 24.

Located between adjacent stator portions 13 and between the stator portion 13 and end plate 14 are windings 25. The windings are of annular form and are preformed. The windings 25 are connected in series in such a manner that the direction of current flow in adjacent windings is in the opposite direction. It will be seen that the outer end of the winding 25 adjacent the plate 14 is connected to the terminal piece 24 the connecting wire passing through a slot formed in the peripheral surface of the plate. The inner end of this winding is connected to the inner end of the adjacent winding 25 and the outer end of this winding is connected to the outer end of the adjacent winding and so on. The inner end of the winding 25 which is nearest to the nut 20 is connected to a terminal 26. The connections between adjacent windings pass through slots formed in the rim portions 16. As will be explained the stator portions are identically formed and therefore each rim portion 16 has a pair of slots although in some cases only one of the slots is utilised.

When the windings are supplied with electric current adjacent rim portions will assume opposite magnetic polarity and the end plate 14 will have a magnetic polarity which is opposite to that of the adjacent rim portion 16.

The armature comprises a stack of annular portions 27 each of which defines an integral inwardly extending pole piece 28. In addition the armature includes an annular member 29 complementary in shape to the pole pieces 28 and also formed from magnetisable material. The armature also includes a transmission member which is integrally formed with the output member 12 and it comprises a rim portion 30 located against the adjacent annular portion 27 and connected to a central boss by means of spokes 31. The rim portion 30 together with the annular portions 27 and the annular member 29 are held in assembled relationship either by a tubular member 32 or by a series of longitudinally extending strip like clamps. The tubular member and the clamps have only to retain the various parts in assembled relationship since the thrust which will be developed when the windings are energised force the annular portions into engagement with each other and with the rim portion 30. They can thus be formed of light material.

The rim portions 16 define pole pieces which are complementary to the pole pieces 28. As will be seen from the drawing in the de-energised condition of the windings the pole pieces 28 and the pole pieces defined by the rim portions 16 are separated by air gaps which decrease in axial width as the armature moves relative to the stator structure. As shown the opposed faces of the pole pieces are inclined to the longitudinal axis of the device but it is possible for the pole faces to be perpendicular to the longitudinal axis. Whichever configuration is employed it is clear that the armature cannot be assembled over the stator structure and hence the armature and the stator structure must be assembled alternately and in sequence. The stator portions and the annular portions of the armature have been assigned reference letters respectively to facilitate the description of the assembly of the device. Assembly starts from the lower end of the device as seen in FIG. 1 and it is convenient to start by locating the end plate 14 about the through bolt 18 and its surrounding insulating sleeve. First the armature portion F is placed in position followed by the stator portion E together with the winding. The outer end of this winding is connected to the terminal piece 24 although if desired this can be done at the end of the assembly sequence. Next the armature portion G is assembled in position followed by the winding and stator portion D. The inner end of the winding associated with the stator portion E is then connected with the inner end of the winding associated with the stator portion D. Next the winding associated with the stator portion C is placed in position and its outer end is connected to the outer end of the winding associated with the stator portion D. Next the armature portion H is inserted in position followed by the stator portion C. The winding associated with the stator portion B is then placed in position and its inner end is connected to the inner end of the winding associated with the stator portion C. Next the armature portion I is placed in position followed by the stator portion B. Finally the winding associated with the stator portion A is placed in position and its outer end connected to the outer end of the winding associated with the stator portion B. This is followed by the armature portion J and the stator portion A. The annular member 29 can then be placed in position. When this has been achieved the washer 22, the terminal 23 and the nut 20 are located on the through bolt and the nut is tightened to maintain the stator in assembled relationship. The armature can also be secured in assembled relationship with the rim portion 30 which is connected to the output member 12.

In order to ensure the maximum efficiency of the device it is necessary that the opposite end surfaces of the stator portions, (identified by the letter "y") should be parallel and it is also essential that the distance "x" between the surfaces should be constant and equal to the distances between the end surfaces of the annular portions 27 forming the armature. Also it is essential that the end surfaces of the armature portions should be parallel. The maintenance of the parallelism and the equality of the aforesaid distance is facilitated by machining the end surfaces of the various parts on the same machine at the same time. Moreover, the windings can be pre-formed which of course facilitates their manufacture.

I claim:

1. An electromagnetic device of the kind comprising a stator structure which defines a plurality of axially spaced circumferentially extending pole having the same diameter, the stator structure including windings which when supplied with electric current cause adjacent ones of said pole pieces to assume opposite magnetic polarity and an armature which surrounds the stator structure, the armature being of annular form and having on its internal peripheral surface pole pieces complementary to the pole pieces on the stator structure characterised in that the stator structure comprises a stack of stator portions each defining a central portion for facial engagement with the adjacent portion, and a rim portion which defines a pole piece and the armature comprises a stack of annular portions each of which defines a pole piece whereby the stator structure and the armature can be assembled alternately and in sequence.

2. A device according to claim 1 characterised in that each of said central portions defines an aperture to receive a through bolt acting to retain said stator portions in assembled relationship.

3. A device according to claim 2 characterised by an end plate which is located against the central portion of an end one of said stator portions.

4. A device according to claim 1 characterised by means retaining said annular portions in assembly.

5. A device according to claim 1 characterised in that the axial thickness of the annular portions is the same as the axial thickness of the stator portions.

6. An electromagnetic device of the kind comprising a stator structure which defines a plurality of axially spaced circumferentially extending pole pieces, the stator structure including windings which when supplied with electric current cause adjacent ones of said pole pieces to assume opposite magnetic polarity, and an armature which surrounds the stator structure, the armature being of annular form and having on its internal peripheral surface pole pieces complementary to the pole pieces on the stator structure, characterized in that the stator structure comprises a stack of stator portions each defining a central portion for facial engagement with the adjacent portion, and a rim portion which defines a pole piece, each central portion defining an aperture to receive a through bolt acting to retain said stator portions in assembled relationship, an end plate located against the central portion of an end one of said stator portions, and means electrically insulating said through bolt from said stator portions, said through bolt acting to convey electric current to the windings, and the armature comprises a stack of annular portions each of which defines a pole piece, whereby the stator structure and the armature can be assembled alternately and in sequence.

7. An electromagnetic device of the kind comprising a stator structure which defines a plurality of axially spaced circumferentially extending pole pieces, the stator structure including windings which when supplied with electric current cause adjacent ones of said pole pieces to assume opposite magnetic polarity, and an armature which surrounds the stator structure, the armature being of annular form and having on its internal peripheral surface pole pieces complementary to the pole pieces on the stator structure, characterized in that the stator structure comprises a stack of stator portions each defining a central portion for facial engagement with the adjacent portion, and a rim portion which defines a pole piece, and the armature comprises a stack of annular portions each of which defines a pole piece, and a tubular member surrounding said annular portions retaining said annular portions in assembly, whereby the stator structure and the armature can be assembled alternately and in sequence.

8. A device according to any one of the claims 1, 2, 3, 5, 6 or 7 characterised in that the pole pieces on the armature overlap the pole pieces defined by the stator structure.

* * * * *